US007839257B2

(12) United States Patent
Cernicka

(10) Patent No.: US 7,839,257 B2
(45) Date of Patent: Nov. 23, 2010

(54) OVERVOLTAGE PROTECTION WITH STATUS SIGNALLING

(75) Inventor: Jozef Cernicka, Nitra (SK)

(73) Assignee: Kiwa Spol. S.R.O., Nitra (SK)

( * ) Notice: Subject to any disclaimer, the term of this patent is extended or adjusted under 35 U.S.C. 154(b) by 103 days.

(21) Appl. No.: 11/916,726

(22) PCT Filed: Jul. 24, 2006

(86) PCT No.: PCT/IB2006/002154

§ 371 (c)(1),
(2), (4) Date: Dec. 10, 2008

(87) PCT Pub. No.: WO2007/017736

PCT Pub. Date: Feb. 15, 2007

(65) Prior Publication Data

US 2009/0302992 A1 Dec. 10, 2009

(30) Foreign Application Priority Data

Aug. 5, 2005 (CZ) .................................. 2005-498
Apr. 28, 2006 (CZ) .................................. 2006-276

(51) Int. Cl.
*H01H 37/76* (2006.01)
*H02H 9/06* (2006.01)

(52) U.S. Cl. .............................. 337/206; 337/5; 337/6; 337/405; 337/406; 337/142; 337/79; 337/148; 337/186; 361/56; 361/103; 361/104; 361/118; 361/127; 338/21; 338/22 SD

(58) Field of Classification Search .................... 337/5, 337/6, 142, 148, 405, 406, 79, 206, 186, 337/412; 361/56, 103, 104, 118, 127; 29/619; 338/21, 22 SD
See application file for complete search history.

(56) References Cited

U.S. PATENT DOCUMENTS 3,638,083 A * 1/1972 Dornfeld et al. ......... 361/321.1

(Continued)

FOREIGN PATENT DOCUMENTS

EP 0436881 7/1991

OTHER PUBLICATIONS

PCT/IB2006/002154 International Search Report and Written Opinion Nov. 28, 2006.

*Primary Examiner*—Anatoly Vortman
(74) *Attorney, Agent, or Firm*—Dority & Manning, P.A.

(57) ABSTRACT

The present invention teaches an overvoltage protection device that includes at least one non-linear resistance element and a single cut-off device coupled with the at least one non-linear resistance element to disable the at least one non-linear resistance element when the at least one non-linear resistance element reaches a pre-determined temperature. The single cut-off device may include stranded wire, a first solder having a first melting point connecting the stranded wire to the at least one non-linear resistance element, and a second solder having a second melting point, higher than the first melting point, connecting the stranded wire to the at least one non-linear resistance element. The single cut-off device may further include a shifting part that shifts when the at least one non-linear resistance element heats the first solder to the first melting point. In other particular embodiments, the overvoltage protection device may further include a status indicator configured to be moved by the single cut-off device to indicate one of at least two conditions of the at least one non-linear resistance element. The status indicator may include a lever, and the single cut-off device moves the lever to indicate the one of at least two conditions of the at least one non-linear resistance element.

8 Claims, 16 Drawing Sheets

U.S. PATENT DOCUMENTS 3,903,494 A * 9/1975 May ............................ 338/20
4,107,759 A * 8/1978 Shirn et al. .............. 361/275.4
4,107,762 A * 8/1978 Shirn et al. ................. 361/534
4,212,045 A * 7/1980 Martzloff ..................... 361/127
4,288,833 A * 9/1981 Howell ........................ 361/124
4,538,347 A * 9/1985 Palilla et al. .................. 29/619
4,652,964 A * 3/1987 Ziegenbein .................. 361/54
4,887,183 A * 12/1989 Biederstedt et al. ......... 361/124
4,975,674 A * 12/1990 Sumiyoshi et al. ............ 338/21
5,315,474 A * 5/1994 Kuriyama ................... 361/534
5,363,272 A * 11/1994 Tanaka et al. ............... 361/534
5,574,614 A * 11/1996 Busse et al. ................. 361/119
5,708,553 A * 1/1998 Hung .......................... 361/103
5,781,394 A * 7/1998 Lorenz et al. ............... 361/124
5,901,027 A * 5/1999 Ziegler et al. ............... 361/124
5,923,238 A * 7/1999 Polzehl et al. .............. 337/283
5,933,310 A * 8/1999 Eggendorfer ............... 361/104
5,982,597 A * 11/1999 Webb .......................... 361/103
6,094,128 A * 7/2000 Bennett et al. ................ 338/21
6,157,528 A * 12/2000 Anthony ..................... 361/106
6,204,746 B1 * 3/2001 Kane et al. ..................... 337/32
6,211,770 B1 * 4/2001 Coyle ............................ 338/21
6,252,488 B1 * 6/2001 Ziegler et al. .................. 337/5
6,307,462 B2 * 10/2001 McLoughlin ................ 338/21
6,430,019 B1 * 8/2002 Martenson et al. .......... 361/124
6,445,277 B1 * 9/2002 Ishikawa et al. ............ 337/297
6,483,686 B1 * 11/2002 Chou ......................... 361/118
6,636,403 B2 * 10/2003 McLoughlin et al. ....... 361/103
7,375,943 B2 * 5/2008 Lu ............................. 361/126
7,453,681 B2 * 11/2008 Ho ............................. 361/127
7,477,503 B2 * 1/2009 Aszmus ...................... 361/124
7,483,252 B2 * 1/2009 de Palma et al. ............ 361/127
7,554,432 B2 * 6/2009 Graf et al. ................... 337/296
7,728,709 B2 * 6/2010 Grunbichler et al. ........... 337/4
7,741,946 B2 * 6/2010 Ho ................................ 337/5
2006/0245125 A1 * 11/2006 Aszmus ....................... 361/56
2008/0129440 A1 * 6/2008 Ho ................................ 337/5

* cited by examiner

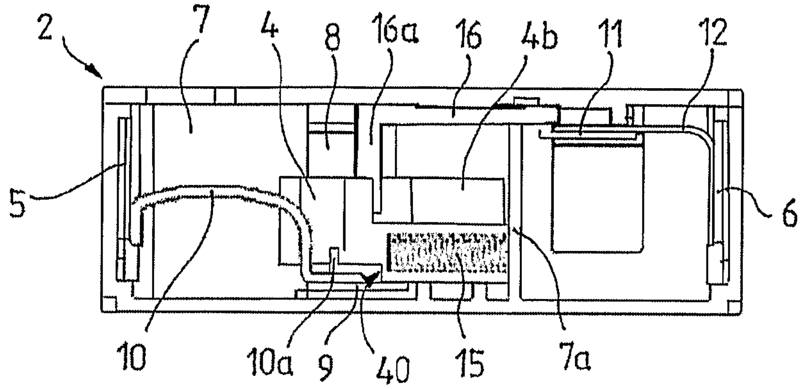
Fig. 6a3
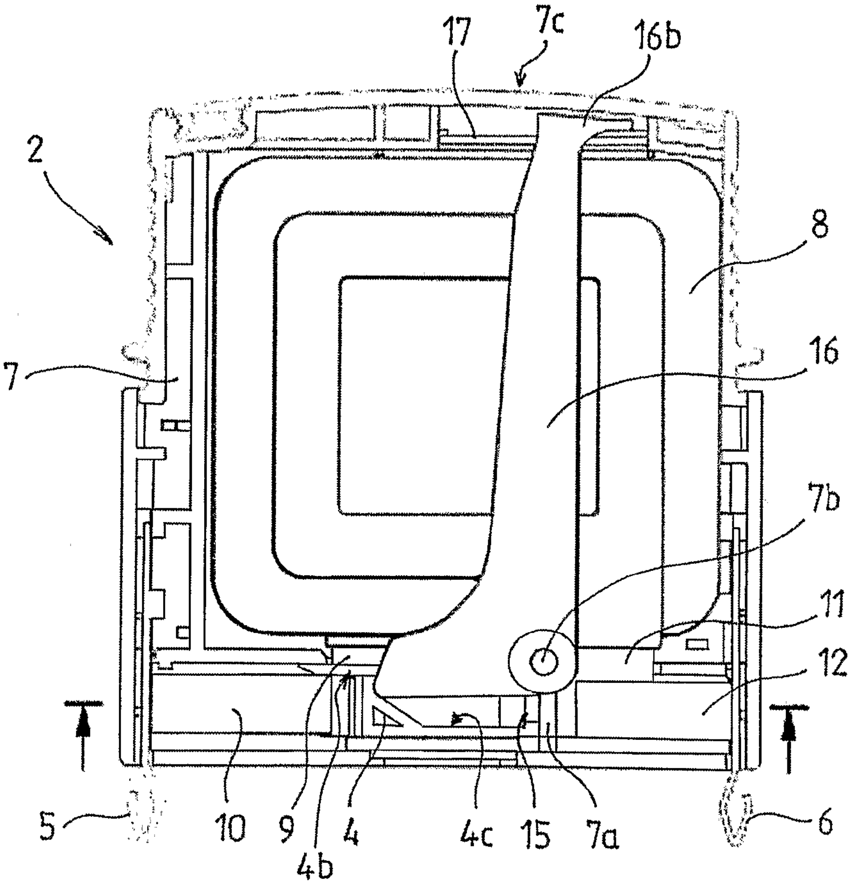
Fig. 6a2
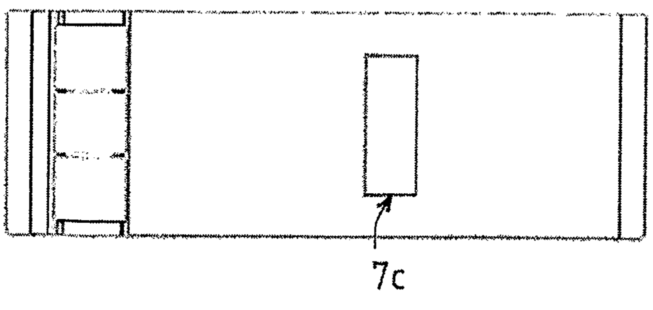
Fig. 6a1

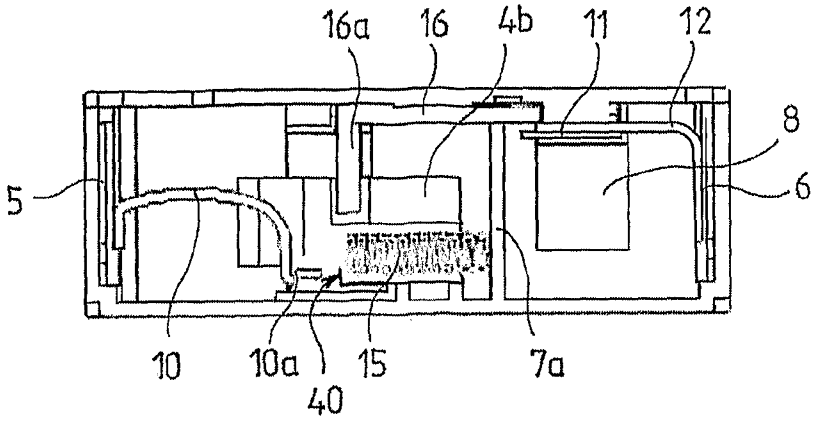
Fig. 6b3
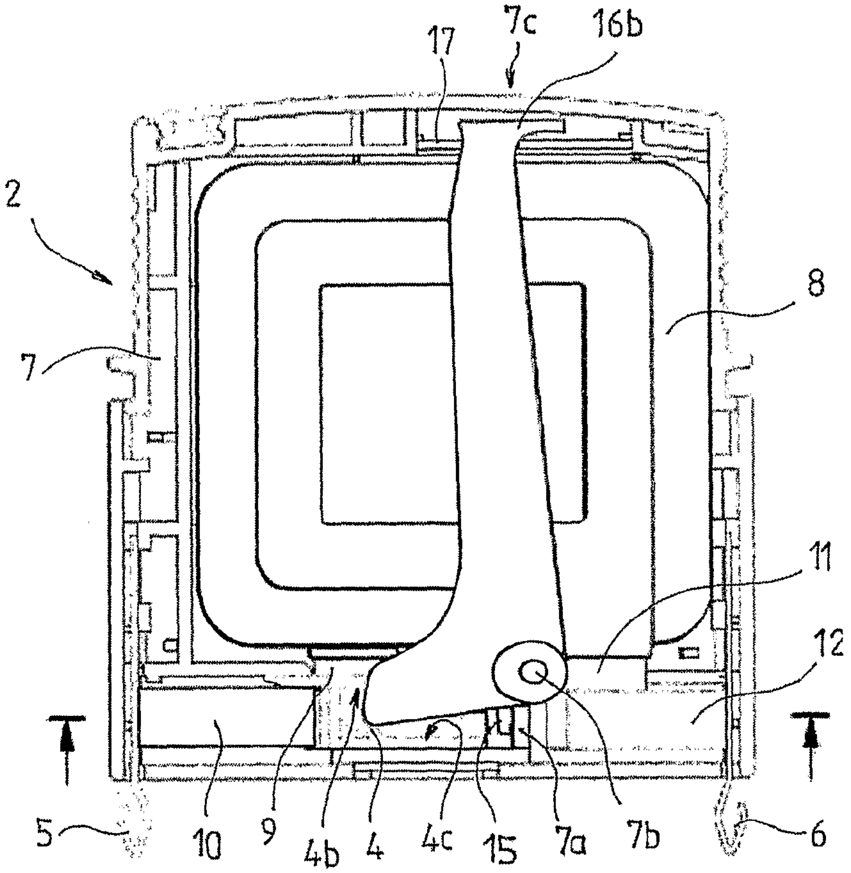
Fig. 6b2
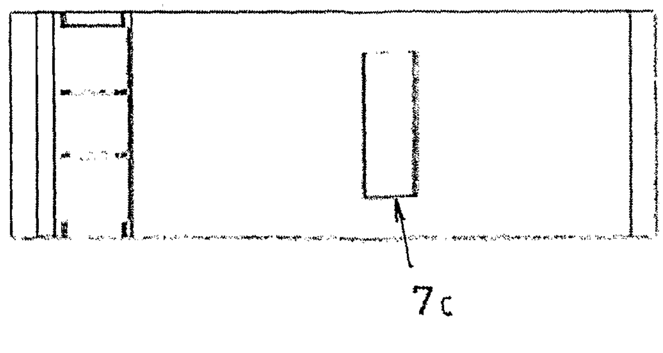
Fig. 6b1

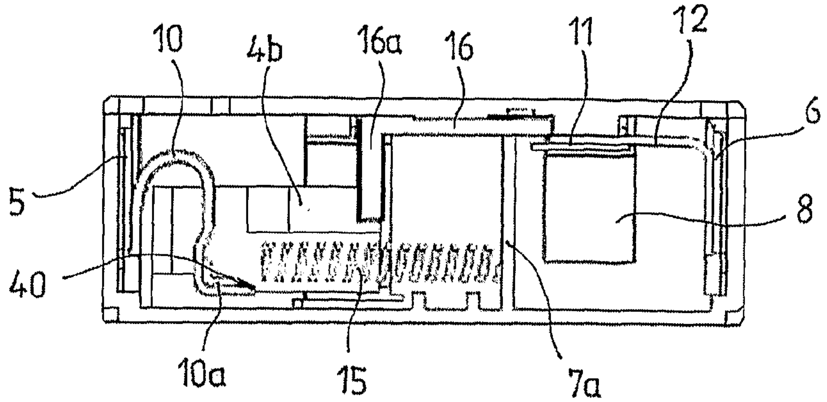
Fig. 6c3
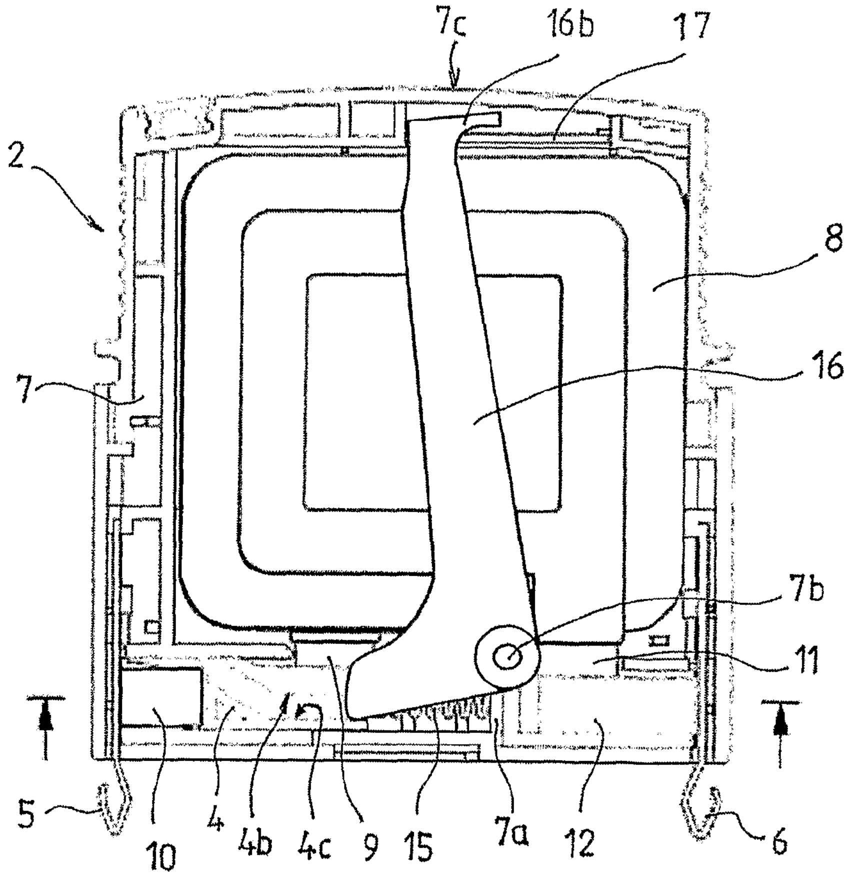
Fig. 6c2
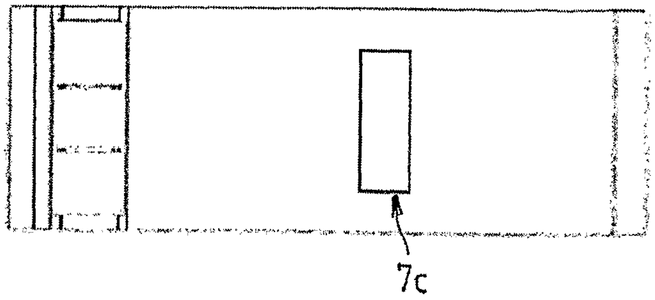
Fig. 6c1

OVERVOLTAGE PROTECTION WITH STATUS SIGNALLING

FIELD OF THE INVENTION

The invention relates to an overvoltage protection device having at least one non-linear resistance element with a cut-off device coupled with a status indicator of overvoltage protection.

BACKGROUND

Overvoltage protection devices have a protective element which generally includes a non-linear element (varistor) which, due to its loading of electric current and by an impulse loading of a protected network, gradually decreases the value of its resistance. Due to this, the current running through the protective element increases, and its temperature increases as well. Therefore, the overvoltage protection includes a temperature cut-off device which serves to disable the protective element due to its temperature, preventing the protective element from properly fulfilling its function. Disabling the protective element from the network is indicated either visually directly on the overvoltage protection or remotely by transmission of a suitable signal. Once the protective element is cut off from the network, the network is no longer protected, so it is necessary to regain the protected status by replacing the protective element of overvoltage protection.

The visual indication of the status of overvoltage protection is required, especially for overvoltage protection of category II equipment according to the IEC 61643-11. This status indicator distinguishes between two modes of status, the "good one"—green color, and the "fault one"—red color. The status modes may be expressed even differently than through this colorful resolution. The disadvantage of such status indicators is that it does not identify when the overvoltage protection is already partially degraded but not yet disabled from the protected circuit by means of a built in cut-off device. Due to the fact that only the enabled or disabled status of the protected circuit is indicated, a situation may occur when the overvoltage protection is degraded due to deterioration t or disabled before the non-functioning or disabled overvoltage protection is replaced by a functioning one, causing the respective electrical circuit to be not protected, and thus increasing the hazard of damage of the non-protected electrical equipment due to an overvoltage condition.

There is a known solution in which between the phase and neutral or ground wire there are included two parallel connected varistors, with each varistor having its own cut-off device from the protected circuit. The first varistor is cut off due to melting of the temperature fuse which causes the pressure spring to move the shifting part to act upon the swiveling part to block about half of the overvoltage protection signal which provides optical information that the overvoltage protection device is partially deteriorated. The shifting part, changes its position to simultaneously activate the remote status indication of overvoltage protection. When the second varistor is cut off, the entire overvoltage protection signal is blocked through the same mechanism to create the visual indication that the entire overvoltage protection for the protected circuit is disabled.

Considerable complexity and coupling of several functional elements results in higher production costs which is disadvantageous for this solution.

There is another known solution which signals partial deterioration of overvoltage protection by means of a pair of parallel connected varistors equipped with cut-off mechanisms, each having its own spring. The function of both cut-off mechanisms always depends on the temperature of both varistors. One of the cut-off mechanisms disconnects at a lower temperature of the varistors than the second one. The status indicator shows a green light in case the overvoltage protection is in flawless status. As a result of the operation load and aging of the varistors, the varistors warm up until the cut-off device with the lower temperature setting actuates to screen the status indicator and produce a yellow color indication, creating a visual indication of partial deterioration of overvoltage protection which is, henceforth functioning. Simultaneously through movement of the cut-off mechanism, the remote status indication of overvoltage protection is activated. As a result of further increasing of varistor temperature, upon co-acting of the second spring, the second cut-off mechanism actuates to screen the status indicator and produce a red color to indicate that the overvoltage protection is totally deteriorated and disabled from the protected circuit.

Disadvantage of this solution is its considerable complexity of a pair of independent complete cut-off mechanisms which results in high costs for such overvoltage protection.

The objective of the invention is to eliminate or at least to minimize the disadvantages of the background art.

BRIEF DESCRIPTION OF THE INVENTION

Advantages of the invention are set forth below in the following description, or may be obvious from the description, or may be learned through practice of the invention.

In one embodiment of the present invention, an overvoltage protection device includes at least one non-linear resistance element and a single cut-off device coupled with the at least one non-linear resistance element to disable the at least one non-linear resistance element when the at least one non-linear resistance element reaches a pre-determined temperature. The single cut-off device includes stranded wire, a first solder having a first melting point connecting the stranded wire to the at least one non-linear resistance element, and a second solder having a second melting point, higher than the first melting point, connecting the stranded wire to the at least one non-linear resistance element.

In particular embodiments, the at least one non-linear resistance element may be a varistor. The single cut-off device may further include a shifting part that shifts when the at least one non-linear resistance element heats the first solder to the first melting point. In addition, the shifting part may shift to disable the at least one non-linear resistance element when the at least one non-linear resistance element heats the second solder to the second melting point. In other particular embodiments, the overvoltage protection device may further include a status indicator configured to be moved by the single cut-off device to indicate one of at least two conditions of the at least one non-linear resistance element. The status indicator may include a lever, and the single cut-off device moves the lever to indicate the one of at least two conditions of the at least one non-linear resistance element.

An alternate embodiment of the present invention is an overvoltage protection device that includes at least one non-linear resistance element and a single cut-off device coupled with the at least one non-linear resistance element to disable the at least one non-linear resistance element when the at least one non-linear resistance element reaches a pre-determined temperature. The single cut-off device includes a lever and a conductive connecting element. A spring connected to the lever biases the lever against the conductive connecting element, and an adaptor is coupled to the conductive connecting element. A first solder having a first melting point connects the adaptor to the conductive connecting element, and a second solder having a second melting point, higher than the first melting point, connects the adaptor to the at least one non-linear resistance element.

A still further embodiment of the present invention is an overvoltage protection device having at least one non-linear resistance element and a single cut-off device coupled with the at least one non-linear resistance element to disable the at least one non-linear resistance element when the at least one non-linear resistance element reaches a pre-determined temperature. The single cut-off device includes a lever, a conductive strip coupled to the at least one non-linear resistance element, and a spring connected to the lever to bias the lever against the conductive strip. A first solder having a first melting point connects the conductive strip adaptor to the at least one non-linear resistance element. A second solder having a second melting point, higher than the first melting point, connects the conductive strip adaptor to the at least one non-linear resistance element.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 6*a*1 shows a rear plan view of a fourth embodiment of the overvoltage protection device indicating the temporary status of overvoltage protection;

FIG. 6*a*2 shows a side plan view of the fourth embodiment of the overvoltage protection device indicating the temporary status of overvoltage protection;

FIG. 6*a*3 shows a front plan view of the fourth embodiment of the overvoltage protection device indicating the temporary status of overvoltage protection (position "everything OK");

FIG. 6*b*1 shows a rear plan view of the fourth embodiment of the overvoltage protection device indicating the temporary status of overvoltage protection;

FIG. 6*b*2 shows a side plan view of the fourth embodiment of the overvoltage protection device indicating the temporary status of overvoltage protection;

FIG. 6*b*3 shows a front plan view of the fourth embodiment of the overvoltage protection indicating the temporary status of overvoltage protection (position "temporary status");

FIG. 6*c*1 shows a rear plan view of a fourth embodiment of the overvoltage protection device indicating the temporary status of overvoltage protection;

FIG. 6*c*2 shows a side plan view of the fourth embodiment of the overvoltage protection device indicating the temporary status of overvoltage protection;

FIG. 6*c*3 shows a front plan view of the fourth embodiment of the overvoltage protection indicating the temporary status of overvoltage protection (position "circuit not protected");

DETAILED DESCRIPTION

Figure 1:
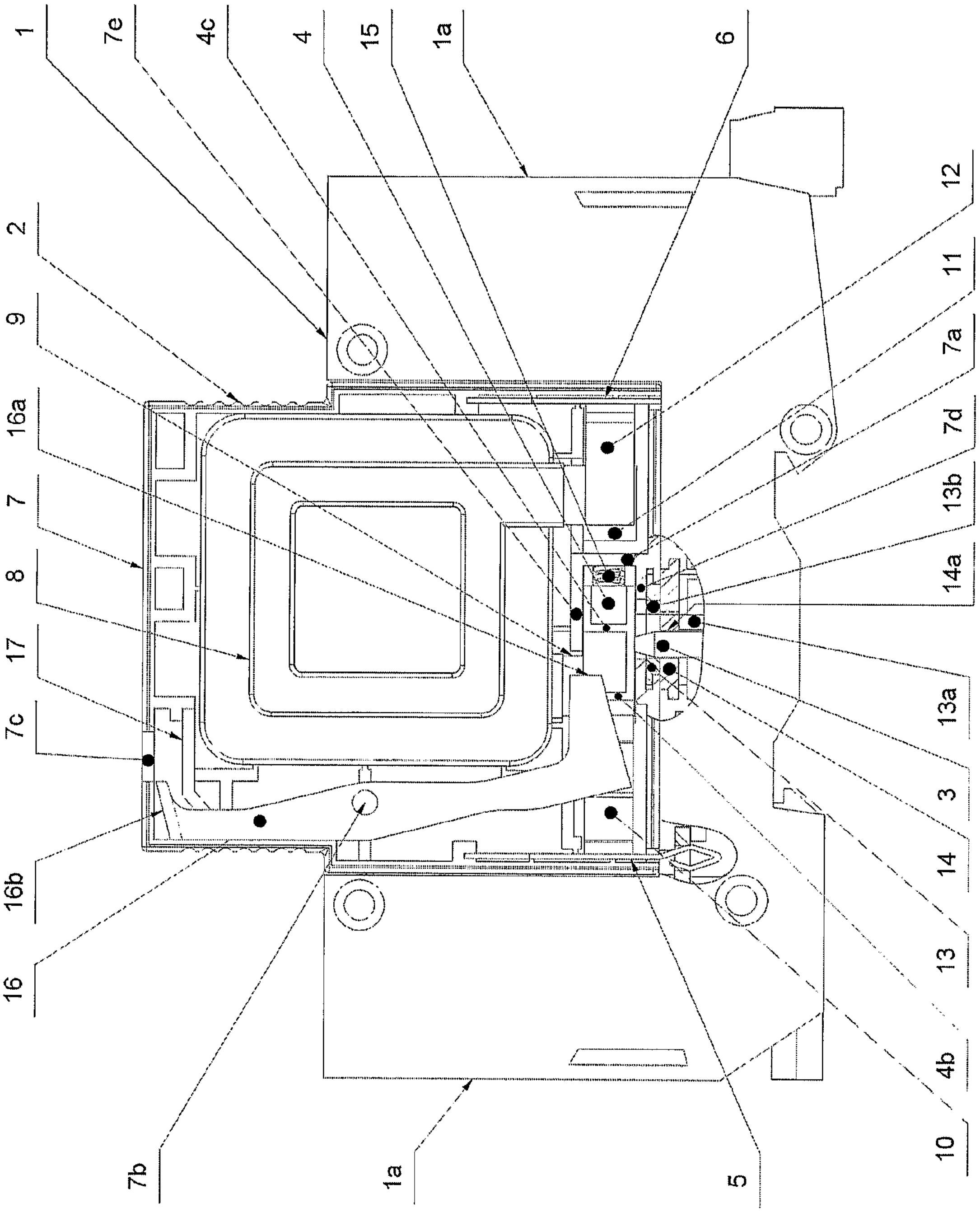
FIG. 1 shows a side plan view of a first embodiment of the overvoltage protection device.
Figure 2:
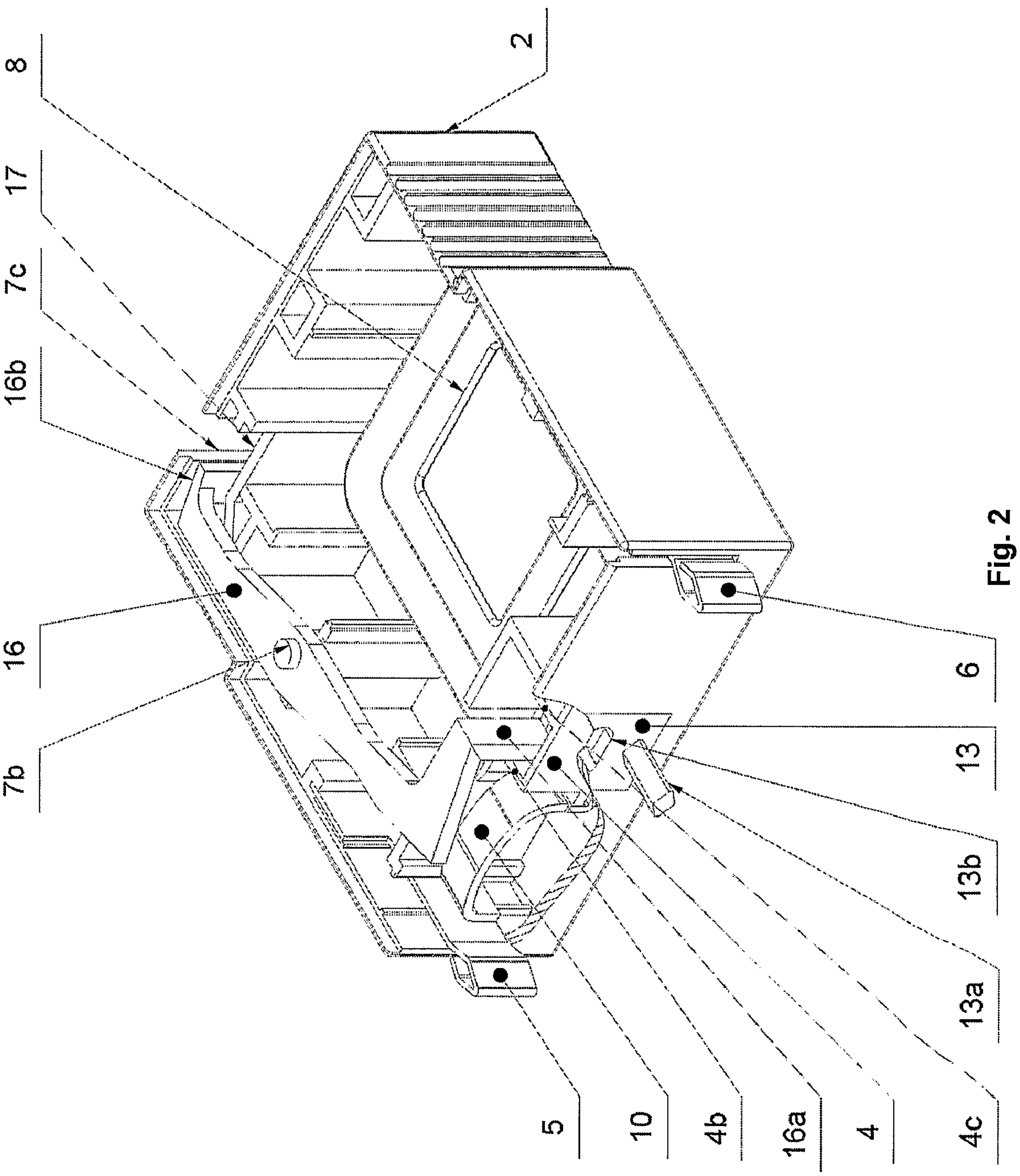
FIG. 2 shows a perspective view of the first embodiment of the overvoltage protection device.
Figure 3A:
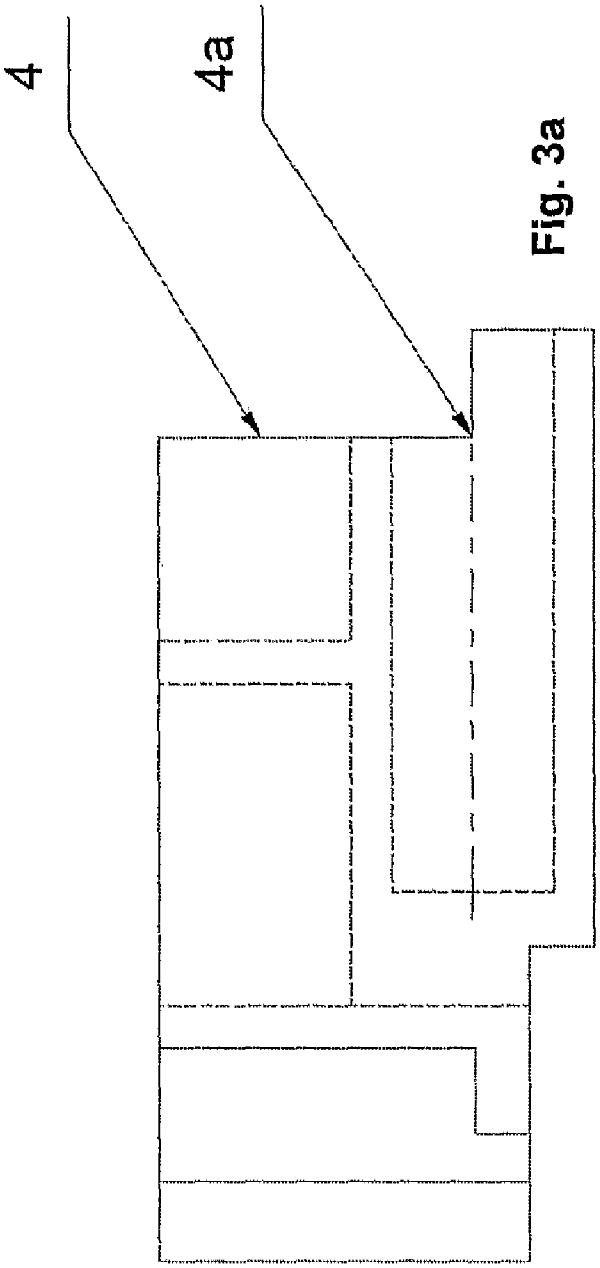
FIG. 3*a* shows a top plan view of the shifting element shown in FIGS. 1 and 2.
Figure 3B:
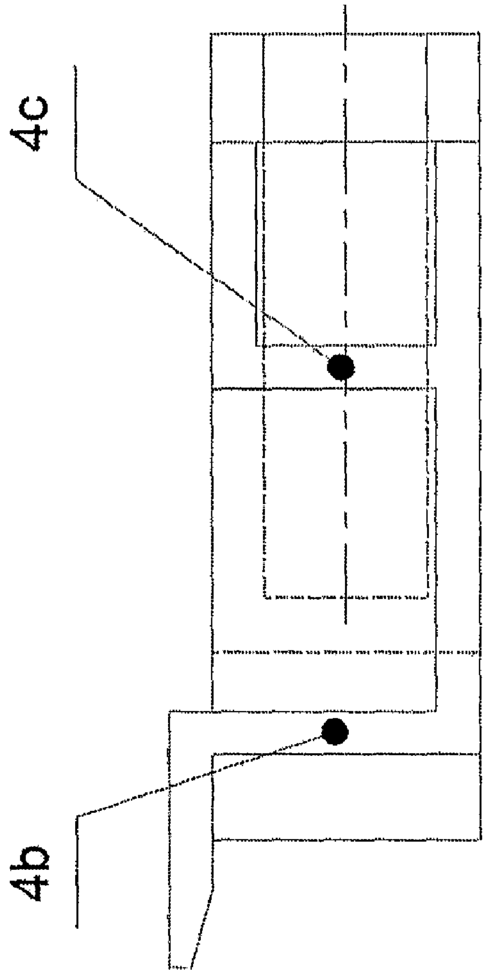
FIG. 3*b* shows a side plan view of the shifting element from FIGS. 1 and 2.
Figure 4A:
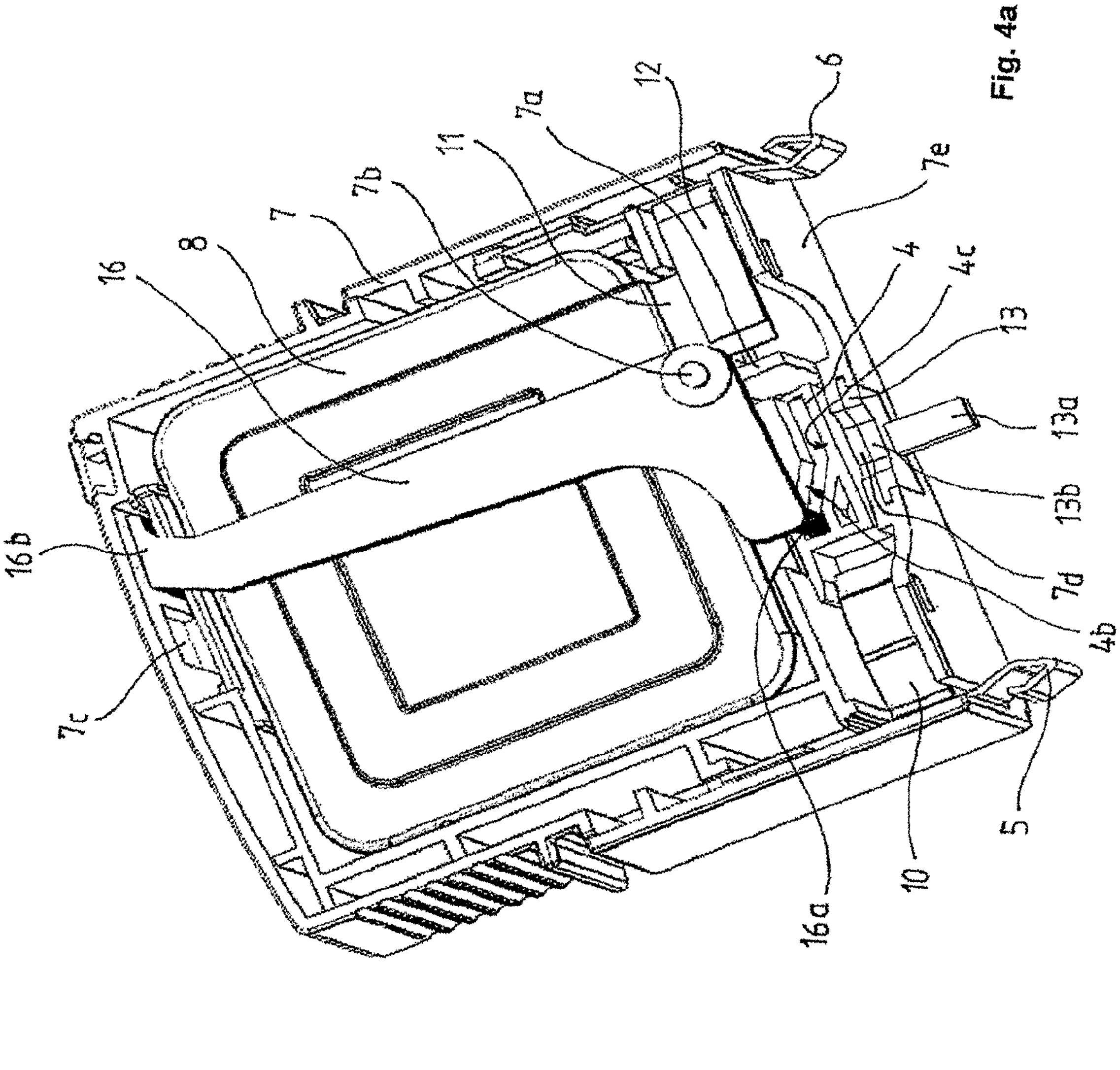
FIG. 4*a* shows a perspective view of a second embodiment of the overvoltage protection device.
Figure 4B:
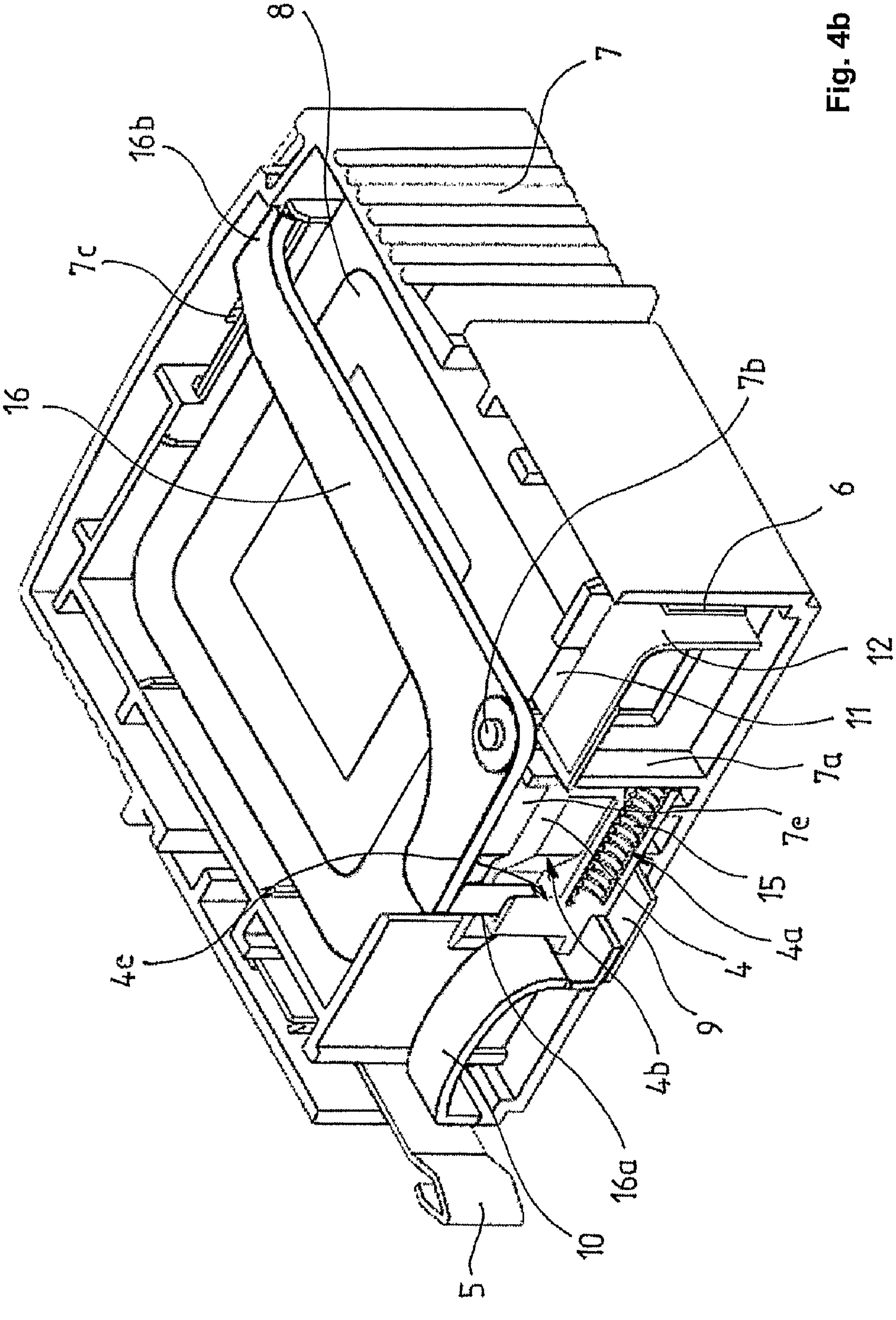
FIG. 4*b* shows a perspective view of the second embodiment of the overvoltage protection device.
Figure 5A:
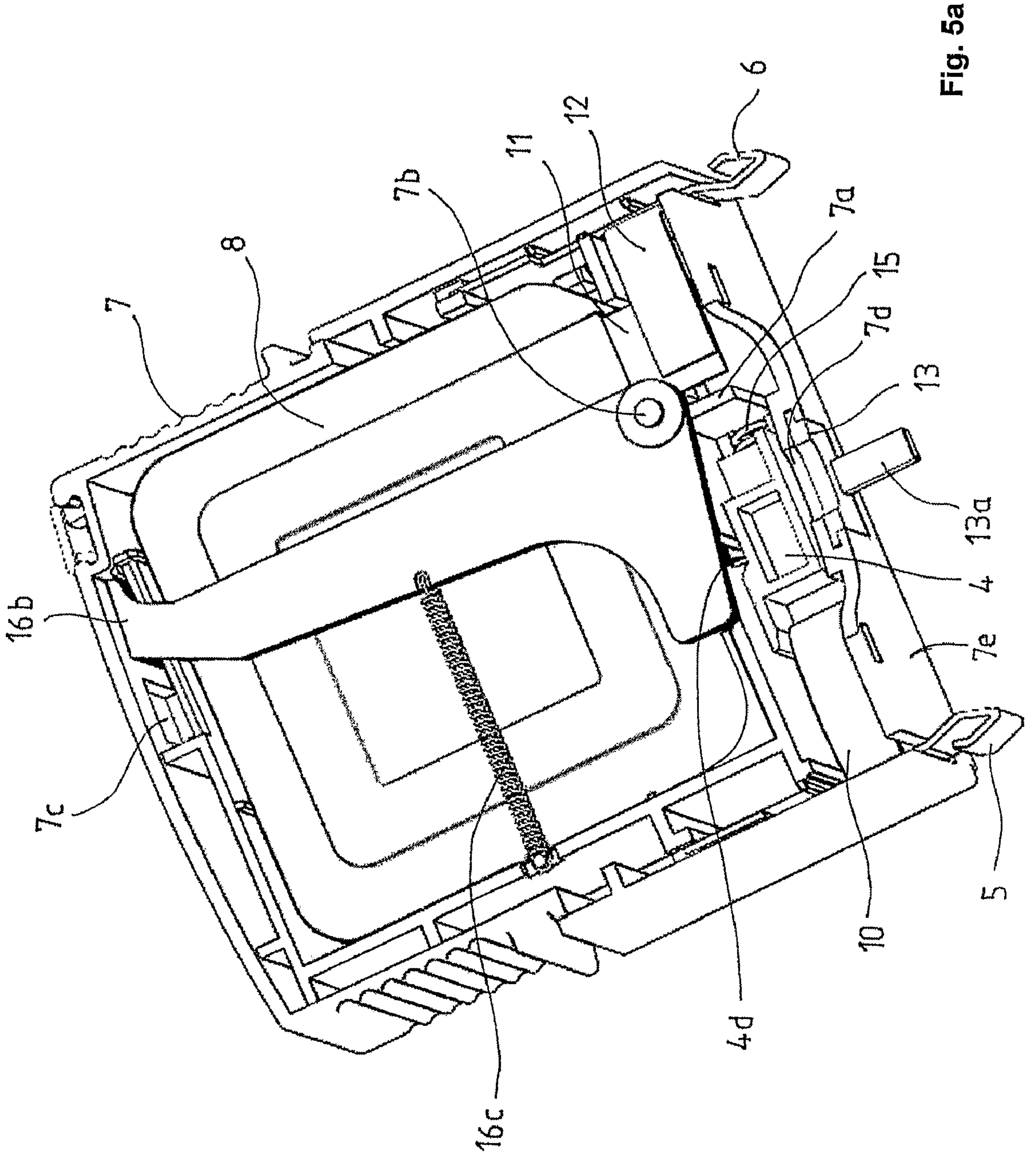
FIG. 5*a* shows a perspective view of a third embodiment of the overvoltage protection device.
Figure 5B:
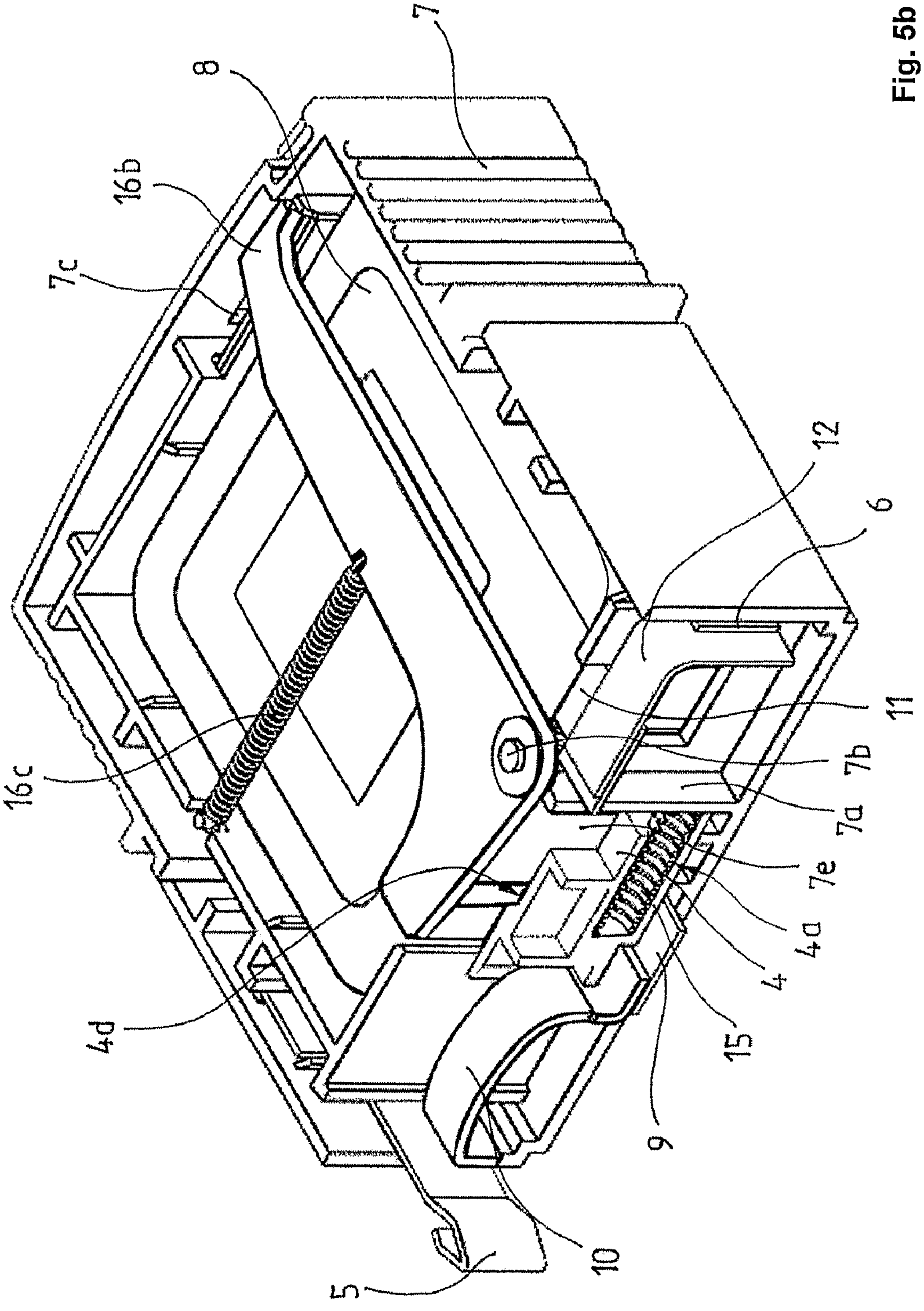
FIG. 5*b* shows a perspective view of the third embodiment of the overvoltage protection device.

In one embodiment, an overvoltage protection device may include a holder 1, in which in a replaceable manner a slide-in protective element 2 is mounted. In one holder 1 several slide-in protective elements 2 may be positioned side by side, e.g., for each phase of a three phase electrical line. Also several single pole holders 1 may be connected into one unit, e.g., using rivets. The holder 1 may include arms 1*a* and 1*b* that may include clamps (not shown) for connecting electric wires of a protected circuit. In the illustrated embodiment of the overvoltage protection device with remote indication of status change, the holder 1 also includes in its lower part a positioning member 3 of remote indication with a pressure spring (not shown). The holder 1 is provided with means for mechanical and electrical connection of the slide-in protective element 2. For electrical connection between the slide-in protective element 2 and the holder 1, the holder 1 is equipped with current lines and contacts, and the slide-in protective element 2 is provided with contacts 5 and 6.

In the body 7 of the slide-in protective element 2 as a protective element, at least one non-linear resistance element is connected, for example, a varistor 8 or a group of parallel connected varistors. A lower electrode 9 of the varistor 8 connects with one end of stranded wire 10 by means of low-fusing solder. The stranded wire 10 may be modified to increase rigidity by welding individual strands to create the stranded wire, for example. The second end of the stranded wire 10 connects with contact 5 of the slide-in protective element 2. An upper electrode 11 of the varistor 8 connects with contact 6 of the slide-in protective element 2, e.g., by means of a connecting element 12, which may be either a fixed part of the contact 6 or may be also an independent element connected to the upper electrode 11 and to the contact 6.

In the body 7 there is also positioned an identifier 13, provided with identification elements 13*a* which, in the engaged status of the slide-in protective element 2 in the holder 1, engage with an identifier 14 on the holder 1 to confirm a correct arrangement of the holder 1 and the slide-in protective element 2 or that the slide-in protective element 2 includes required protective properties.

Figure 6D:
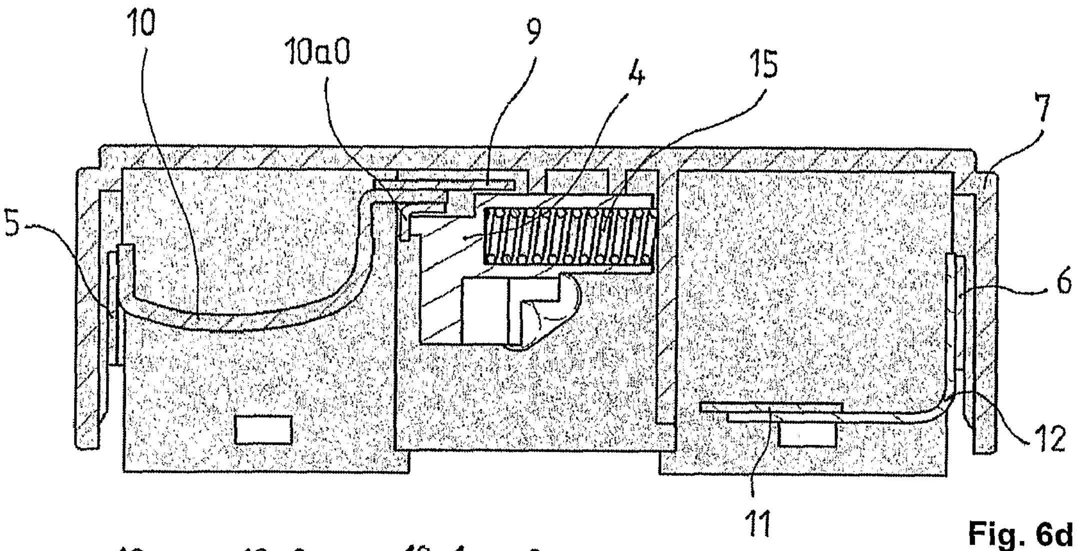
FIG. 6*d* shows a cross section view of an embodiment of the shifting part, stranded wire, and stop.
Figure 6E:
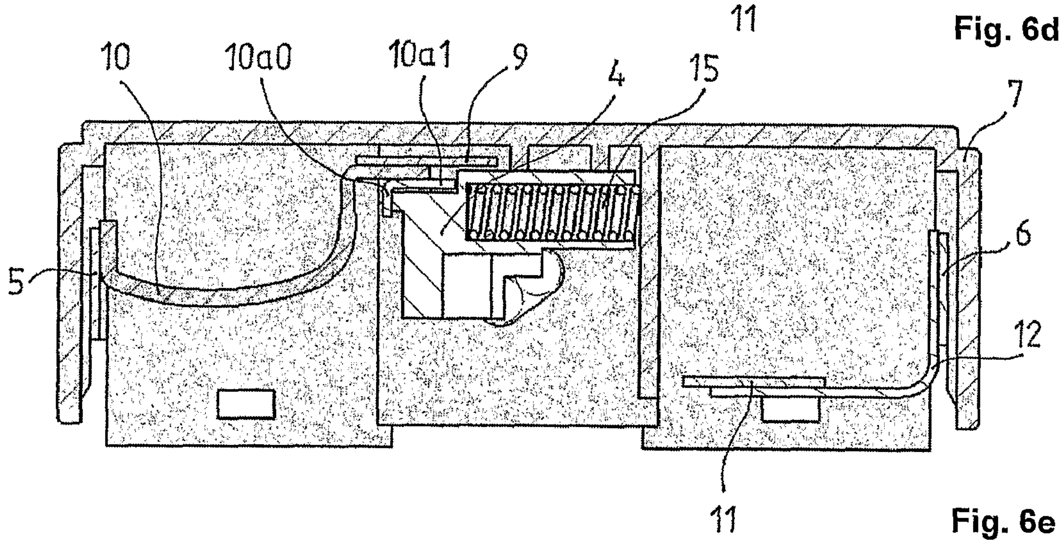
FIG. 6*e* shows a cross section view of an alternate embodiment of the shifting part, stranded wire, and stop.

In the body 7 of the slide-in protective element 2 in a shifting manner there is positioned a shifting part 4, which, by means of a pressure spring 15, is spring-loaded directly against the stranded wire 10 and acting on the low-fusing link of the stranded wire 10 and against the lower electrode 9 of the varistor 8. The pressure spring 15 in the illustrated embodiment is positioned in a cavity 4*a* of the shifting part 4 and rests against a wall 7*a* of the body 7 of the slide-in protective part 2. The connection of the stranded wire 10 and the lower electrode 9 of the varistor 8 holds the shifting part 4 in its basic position when the pressure spring 15 is depressed. In the embodiment illustrated in FIGS. 6*a* to 6*e*, on the upper side of the stranded wire 10 in the area of its connection with lower electrode 9 of the varistor 8, a stop 10*a* is fastened to provide a temperature suitable link between the stranded wire 10 and the lower electrode 9. In this embodiment, the shifting part 4 rests against the stop 10*a* (is pressed to it by the spring 15) and primarily acts against the link of the stop 10*a* and the stranded wire 10 to hold it in its basic position when the pressure spring 15 is depressed. Implicitly through the stop 10*a*, the shifting part 4 is also acting upon the link of lower electrode 9 and the stranded wire 10. In the embodiment illustrated in FIG. 6*d*, the shifting part 4 in the initial position rests against a vertical portion 10*a*0 of the stop 10*a*. In the embodiment illustrated in FIG. 6*e*, the shifting part 4 in its initial position rests against the vertical portion 10*a*0 of the stop 10*a* and also against a horizontal portion 10*a*1 of the stop 10*a*. In the embodiments illustrated in FIGS. 6*a* to 6*e*, the shifting part 4 includes a pressure wall 40 to engage with one end of the stranded wire 10 when the shifting part 4 actuates. Also, the embodiments shown in FIGS. 1 to 5*b* may be adapted to include the stop 10*a*, the purpose and function of which will be described hereinafter.

In the embodiments shown in FIGS. 1 to 4*b*, the shifting part 4, between its walls 4*b* and 4*c*, has an inserted lower arm 16*a* extending from one end of a flat lever 16. The flat lever 16 is rotatably mounted on the body 7 by a pin 7*b* located outside the perimeter of the varistor 8 or the varistors 8. In the embodiment shown in FIG. 5*a* and 5*b*, the shifting part 4, instead of the walls 4*b* and 4*c*, includes a gradual wall 4*d* against which the lower arm 16*a* of the lever 16 rests, this being rotatably mounted on the body 7 by the pin 7*b*. The lower arm 16*a* of the lever 16 permanently contacts the gradual wall 4*d* of the shifting part 4, maintained by a tension spring 16*c* connected on one end to the body 7 and on a second end to the lever 16. The tension spring 16*c* may be substituted with a pressure spring (not shown), arranged in a suitable manner. In the embodiment shown in FIG. 6*a* to 6*c*, the shifting part 4 includes the walls 4*b* and 4*c* that form the cranked groove in which the lower arm 16*a* is inserted.

The lever 16 on its other end is equipped with an indicator arm 16*b* provided with the colorful surface or colorful surfaces for visual indication of the status of overvoltage protection. For that purpose the body 7 is provided with a slot 7*c* of visual indication. In the slot 7*c* of visual indication is a surface or insert 17 with color corresponding to the visual indication of the status of overvoltage protection, in which the indicator arm is not attached to the slot 7*c* in the body 7.

The lower wall 7*e* of the body 7 and the identifier 13 include oval slots 7*d* and 13*b* through which the above described positioning member 3 passes and rests against the shifting part 4. The positioning member 3 at the slide-in protective element 2 is inserted in the holder 1 and contacts the shifting part 4 to transmit the status information of overvoltage protection for remote indication through respective functional elements in the holder 1. In the displaced position of the shifting part 4 (it will be described hereinafter), the positioning member 3 moves into the body 7 of the slide-in protective element 2. The identifier 13 is equipped with identifying protrusions 13*a* that engage with corresponding holes in the holder 1.

Figure 7B:
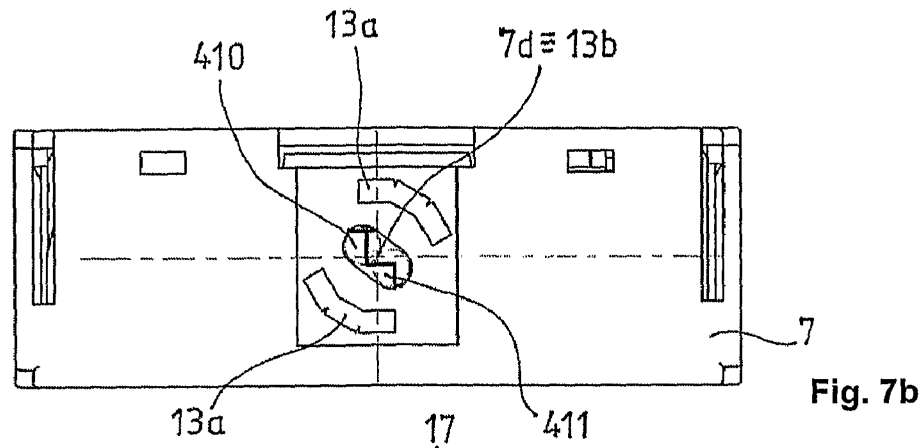
FIG. 7*b* shows a cross section view in B direction from FIG. 7*a;*
Figure 7A:
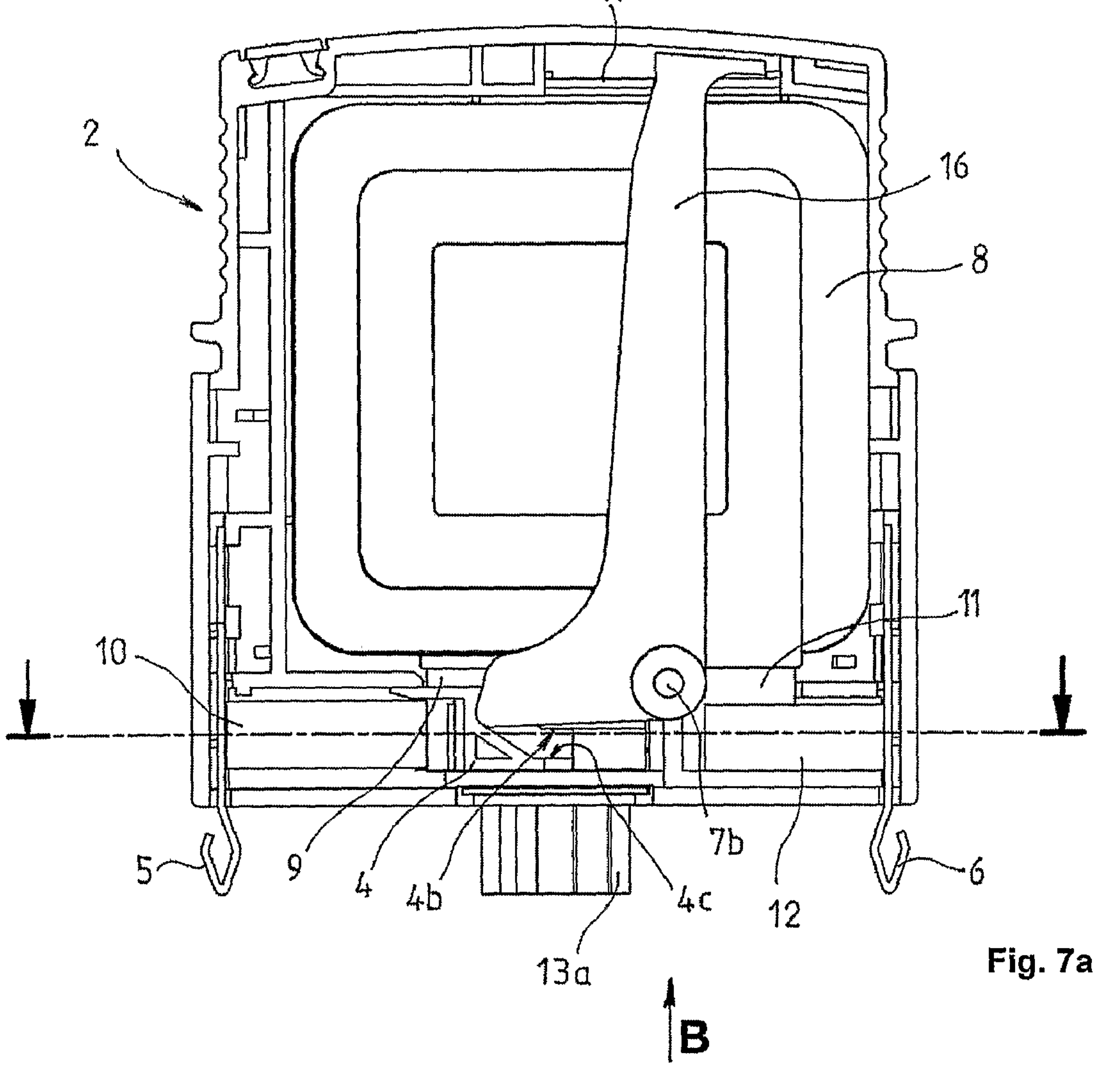
FIG. 7*a* shows a side plan view of an embodiment of the slide-in protective element with encoding device and with a device to enable turning of the slide-in protective element by 180° without affecting its function.
Figure 7C:
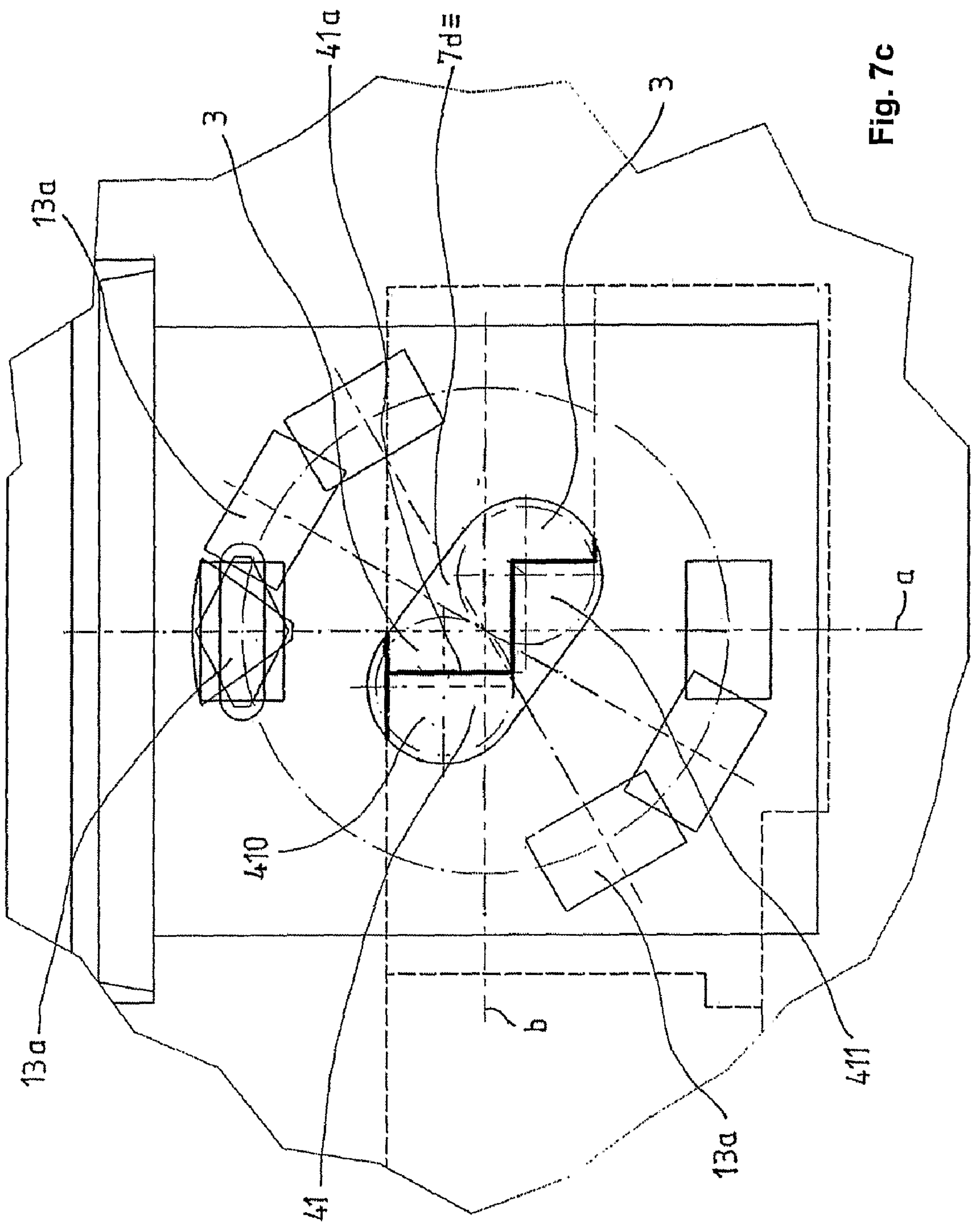
FIG. 7*c* a detail of the embodiment of encoding device to enable turning of the slide-in protective element by 180° without affecting its function.

FIGS. 7*a* to 7*c* show an embodiment that enables the slide-in protective element 2 to rotate in the holder 1 by 180° without influencing the protective and indication (remote as well as visual) functions of the slide-in protective element 2. In this embodiment, the positioning member 3 in the holder 1 is situated outside the axis "a" of symmetry of the contacts 5, 6 or outside the centre of distance of contacts 5, 6, and simultaneously it is situated also outside the longitudinal axis "b" of the slide-in protective element 2. Oval slots 7*d* and 13*b* are situated askew to axes "a" and "b". The shifting part 4 includes a supporting wall 41 with a gradual end 41*a*. In each portion of the skewed oval slots 7*d* and 13*b* is a section 410, 411 of supporting wall 41 of the shifting part 4. In basic position of the shifting element 4, the end of the spring-loaded positioning member 3 in one position of the slide-in protective element 2 is touching the first section 410 of supporting wall 41 of the shifting part 4, while in position of the slide-in protective element 2 turned by 180°, the end of the spring-loaded positioning member 3 is touching the second section 411 of the supporting wall 41 of the shifting part 4. In displaced position of the shifting part 4, both sections 410, 411 of supporting wall 41 are situated outside the track of the spring-loaded positioning member 3, and it does not prevent it to be inserted into the skew oval slots 7*d* and 13*b* into the body 7 of the slide-in protective element 2 for the remote indication of the status of the overvoltage protection. In angle spacing on the circle around the crosswise arranged oval slots 7*d*, 13*b* there are positioned the identification protrusions 13*a* engaging in both positions of the slide-in protective element 2 (initial as well as the turned by 180°) into the corresponding holes in the holder 1. In an embodiment not illustrated, the slide-in protective element 2 my not turn in the holder 1.

In embodiments illustrated in FIGS. 1 to 3*b*, all of the elements of the device for cutting off the non-linear resistance element from network and all of the elements of status indication (visual as well as remote) of overvoltage protection inside the body 7 of the slide-in protective element 2 are located entirely outside the perimeter of the non-linear resistance (varistor 8) in the view in direction perpendicular to the side surface of the non-linear resistance element (varistor 8), i.e., in the direction of the body width 7. In this arrangement, it is possible to position the required number of parallel connected non-linear resistance elements (varistors 8) side by side in the direction of width of the body 7 without modifying the device for indicating the status of overvoltage protection. When using a lower than maximum number of non-linear resistance elements (varistors 8), the remaining space of the body 7 between the side wall of non-linear resistance elements (varistors 8) and the side wall of the body 7 is free, and no part of the device for cutting off the non-linear resistance element from the network or of the indication (visual as ell as remote) of the status of overvoltage protection is in this space.

In the embodiments shown in FIGS. 4*a* to 6*c*, the pin 7*b*, on which the lever 16 is rotatably mounted, is situated outside the perimeter of the non-linear resistance element (varistor 8) in the view in direction perpendicular to the side surface of the non-linear resistance element (varistor 8), i.e., in direction of width of the body 7, while the lever 16 is flat in the direction parallel with the side wall of the non-linear resistance element (varistor 8). The lower arm 16*a* and the indicator arm 16*b* are situated outside the perimeter of the non-linear resistance element (varistor 8) in the view in direction perpendicular to side wall of the non-linear resistance element (varistor 8), i.e., in direction of width of the body 7. Also, the tension spring 16*c* used in the embodiment shown in FIGS. 5*a* and 5*b* is parallel with the side wall of the non-linear resistance element (varistor 8). As shown in the embodiments of FIGS. 4*a* to 6*c*, it is possible to arrange in the body 7 non-linear resistance elements (varistors 8) having larger dimensions (and also of performance) differently than shown in the embodiments of FIGS. 1 to 3*b* so that the overvoltage protection has the same external dimensions and can use the unified holder 1.

The overvoltage protection device in embodiments shown in FIGS. 1 to 7*c* works in the following way.

Upon occurrence of overvoltage in a protected electrical circuit, the overvoltage protection fulfils its function, i.e., it decreases overvoltage in the protected circuit to the permissible value. Nevertheless, aging and overloading of the protective element (non-linear resistance element, varistor 8, a group of varistors, etc.), change the properties of the protective element. For example, electrical current gradually flows through the protective element (varistor 8), which causes the protective element (varistor 8) to increase in temperature. Heat from the protective element (varistor 8) naturally flows to the outlets 9 and 11, causing the lower electrode 9 of varistor 8 to gradually warm up.

In the embodiments according to FIGS. 1 to 5*b*, the increased temperature of the lower electrode 9 of varistor 8 causes melting of the solder connecting the outlet to the stranded wire 10. As a result, the link loses its rigidity, and pressure from the spring 15 moves the shifting part 4 to the end of the stranded wire 10) towards the contact 5. This disconnects the outlet of the lower electrode 9 from the stranded wire 10, thus disconnecting the protective element (varistor 8) from the network. In the embodiments shown in FIGS. 1 to 3*b*, the movement of the shifting part 4 in the initial phase does not change the position of the lever 16. Nevertheless, the wall of the shifting part 4*b* does not support the lever 16 any more in the position which is not screened. With further shift of the shifting part 4 upon the lower arm 16*a* of the lever 16, the wall 4*c* of shifting part 4 starts its acting and turns the lever 16 on the pin 7*b*, and the indicator arm 16*b* of the lever 16 screens the slot 7*c* of visual indication, which changes the visual indication of the status of overvoltage protection. In the embodiments shown in FIGS. 4*a* and 4*b*, the shifting of the shifting part 4 turns the lever 16 through the lower end 16*a* of the cranked groove between the walls 4*b* and 4*c* of the shifting part 4, and the indicator arm 16*b* of the lever 16 screens the slot 7*c* of visual indication, changing the visual indication of the overvoltage protection. In the embodiment shown in FIGS. 5*a* and 5*b*, the shift of the shifting part 4 turns the lever 16 through the gradual wall 4*d* of the shifting part 4, with which the lower end 16*a* of the lever 16 is maintained in contact by means of the spring 16*c*. As a result, the indicator arm 16*b* of the lever 16 screens the slot 7*c* of visual indication, which causes a change of the visual indication of the status of overvoltage protection. Shift of the shifting part 4 in all of these embodiments also clears the space for pushing forward the positioning member 3 by the pressure spring (not shown). As the positioning member 3 pushes forward, it produces the remote indication of status change of overvoltage protection. The attending person then easily remotely or at the personal inspection of the overvoltage protection recognizes that the given slide-in protective part 2 must be replaced.

In the embodiments of FIGS. 6*a* to 6*e*, sufficient heating of the lower electrode 9 of the varistor 8 melts the solder by which the stranded wire 10 is connected with the stop 10*a*. This causes the link between the stranded wire 10 and the stop 10*a* to lose rigidity. The shifting part 4 shifts from the pressure spring 15 to shift the stop 10*a* towards the contact 5 until it is stopped by the stranded wire 10, which is all the time connected with the lower electrode 9 of varistor 8, and at the same time the protective element (varistor 8) is all the time connected to the network. This limited movement of the shifting part 4 acts upon the lower end 16*a* of the lever 16, which in a restricted way turns into the position so that the visual indicator arm 16*b* of the lever 16 adjusts on the colored surface indicating the "temporary status" of overvoltage protection (i.e. status when the non-linear resistance element (varistor 8) is getting warm due to various influences, still fulfilling its function). Already in this "temporary status," it is recommended to replace the slide-in element 2 preventively as the moment of total disconnection of the overvoltage protection from the protected circuit is approaching. Simultaneously this limited movement of the shifting part 4 causes a change on the positioning member 3 of remote indication, which is then remotely indicated as a fault status "circuit is not protected", by which the possibility of timely replacement of the slide-in protective element 2 is secured still before the total fallout of the overvoltage protection. With ongoing warming of the lower electrode 9 of varistor 8 consequently the solder is melted, (by which the lower electrode 9 of varistor 8 is connected with stranded wire 10), through which even this link loses its rigidity, and the shifting part 4 upon pressure of the pressure spring 15 shifts the end of stranded wire 10 also with the stop 10*a* towards the contact 5, by which the lower electrode 9 of varistor 8 is disconnected from the stranded wire 10, thus the non-linear resistance element (varistor 8) is disconnected from the network. This further shift of the shifting part 4 causes another turning of the lever 16, whose indicator arm 16*b* positions on the colored surface indicating the status "circuit not protected".

Figure 8:
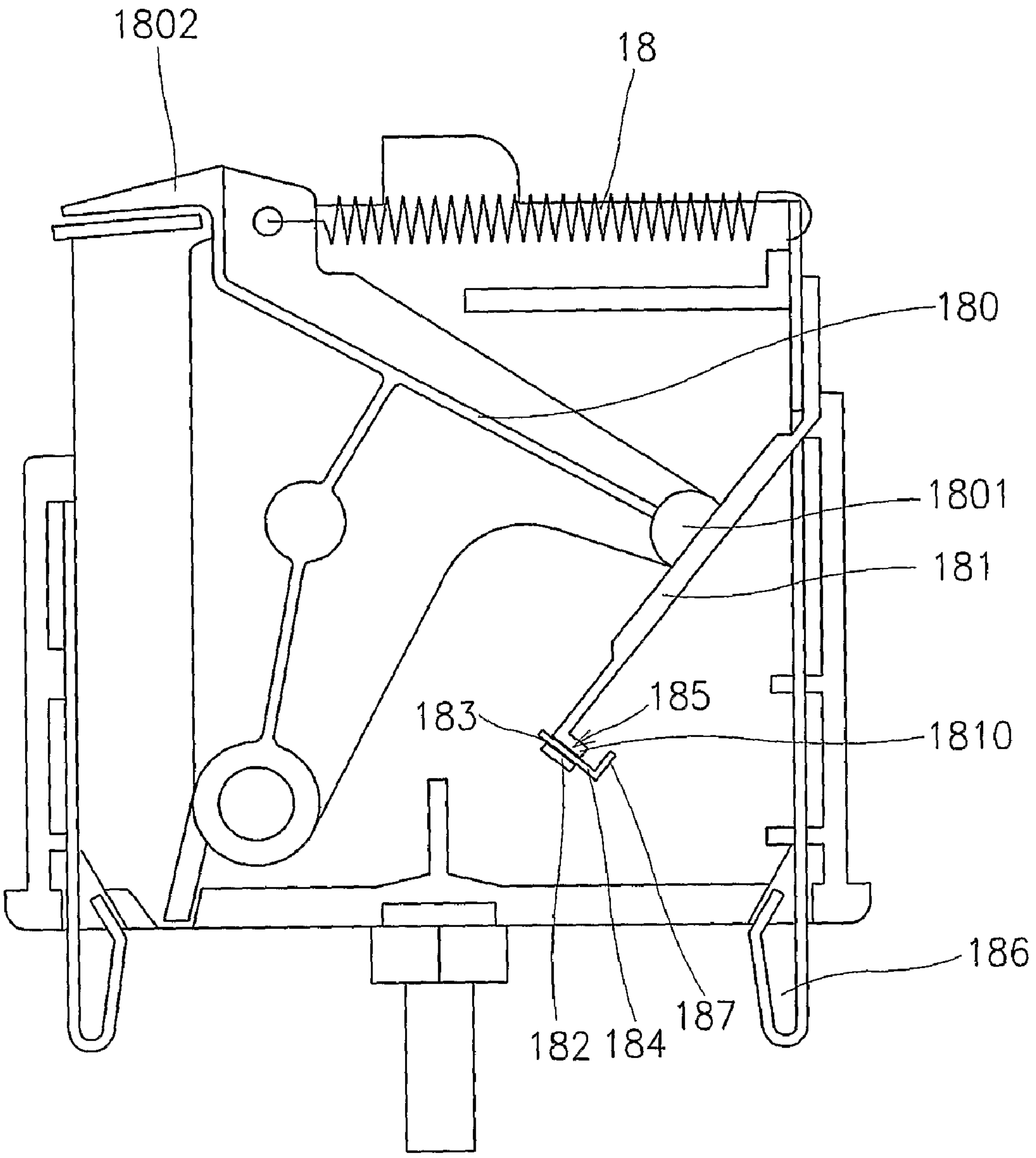
FIG. 8 shows a side plan view of another alternative embodiment of overvoltage protection with temporary status indication of overvoltage protection.

In the embodiment shown in FIG. 8, the overvoltage protection has a different mechanism than the embodiment shown in FIGS. 1 to 7*c*. Here, the respective cut-off mechanism includes a spring 18 which acts on a "T" lever 180. One arm 1801 acts against a conductive connecting element 181. A solder 185 with a lower melting temperature connects an end 1810 of the connecting element 181 with an adapter 184. A solder 183 with a higher melting temperature connects the adapter 184 with an electrode 182 of a non-linear resistance element (varistor). Adapter 184 is electrically conductive with a contact 186 of overvoltage protection. A stop 187 restricts movement of the connecting element 181. Through warming from the electrode 182, the solder 185 with the lower melting temperature is molten first, after which the spring 18 acts to turn the lever 180, and the connecting element 181 is shifted opposite the stop 187, by which an indicator end 1802 of the lever 180 shifts and indicates partial deterioration of overvoltage protection, e.g., it changes the indicating window to yellow. The overvoltage protection is all the time functioning. Through further warming from the electrode 182, the solder 183 with the higher melting temperature is molten. This causes further turning of the lever 180 by action of the spring 18. The connecting element 181, the adapter 184, and the stop 187 are displaced from the electrode 182, disconnecting the electrode 182 from contact 186, and the indicator end 1802 of the lever 180 further shifts and indicates total impairment of overvoltage protection, e.g., it changes the indicating window to red. In this way the overvoltage protection is disconnected from the protected circuit.

Figure 9:
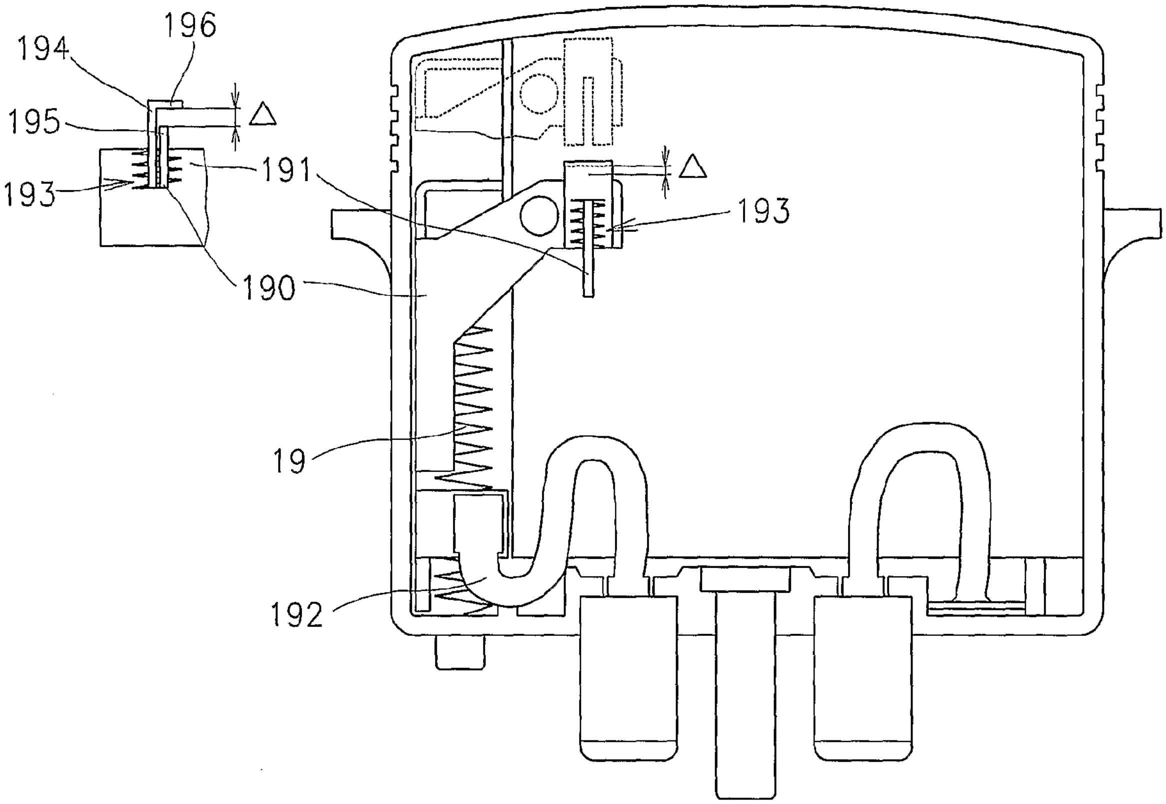
FIG. 9 shows a side plan view of another alternative embodiment of overvoltage protection with temporary status indication of overvoltage protection.

In the embodiment illustrated in FIG. 9, the overvoltage protection includes a spring 19, which applies a permanent pressure to a conductive connecting element 190, through which an electrode 191 of non-linear resistance element (varistor) is electrically connected with the stranded wire 192. Interlink 194 is connected electrically by means of solder 193 with a higher melting temperature with electrode 191. The interlink 194 is connected electrically by means of solder 195 with a lower melting temperature with conductive connecting element 190. The interlink 194 is equipped with a stop 196 of the conductive connecting element 190. By warming from electrode 191, the solder 195 with the lower melting temperature is molten, causing the conductive connecting element 190 through action of the spring 19 to shift by the distance Δ to the stop 196 on the interlink 194. This shift of the conductive connecting element 190 produces the indication of partial deterioration of overvoltage protection, e.g., the conductive connecting element 190 changes the window of visual indication to yellow. By further warming, the solder 193 with the higher melting temperature is molten, releasing the interlink 194 entirely, and the conductive connecting element 190 through action of the spring 19 disconnects from contact 191, disconnecting the overvoltage protection from the protected circuit and producing an indication of entire impairment of overvoltage protection, e.g., the conductive connecting element 190 changes a window of visual indication to red.

Figure 10:
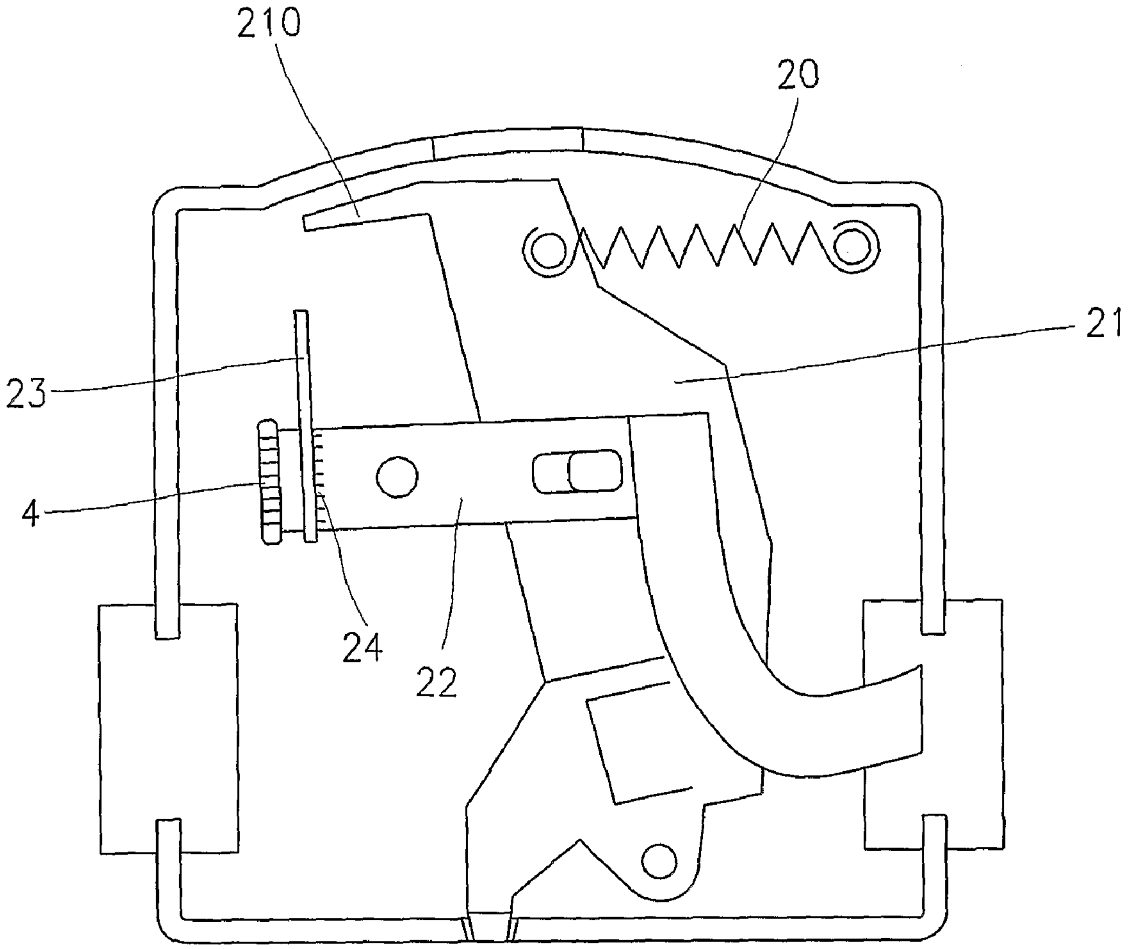
FIG. 10 shows a side plan view of another alternative embodiment of overvoltage with temporary status indication of overvoltage protection.

In the embodiment illustrated in FIG. 10, the overvoltage protection contains a spring 20 which constantly acts by tension upon a lever 21 that acts upon a conductive strip 22 passing through a hole in an electrode 23 of non-linear resistance element (varistor). The conductive strip 22, in the initial status when the overvoltage protection is entirely intact, is connected by means of a solder 24 with a lower melting temperature to the electrode 23 of non-linear resistance element (varistor). At the end of conductive strip 22 behind the electrode 23, the conductive strip 22 is provided with a stop being released by heat, e.g., the strip is coated with a layer or a ball or other suitable shape of solder 25 with a higher melting temperature which prevents the conductive strip 22 from slipping out from the hole in electrode 23 when the solder 25 is non-molten. By warming the electrode 23 of varistor, the solder 24 melts first, and the spring 20 turns the lever 21, pulls the conductive strip 22 from the solder 24 to the electrode 23. Through movement of the lever 21, the indication of partial deterioration of overvoltage protection is established, e.g., the indicator arm 210 of the lever 21 changes a window of visual indication to yellow, and possibly the remote indication is established. By further warming of electrode 23, the solder 25 with the higher melting temperature is molten, and the conductive strip is released from electrode 23, the spring 20 turns the lever 21 further, thus establishing the indication of total impairment of overvoltage protection, e.g., indicator arm 210 of the lever 21 changes the window of visual indication to red, and possibly the remote indication is established.

The main principle of invention flows from the above mentioned description of various arrangements, which consists in that the gradually of individual steps of indicating partial and then total impairment of overvoltage protection is exercised always by a single cut-off mechanism, indicating partial impairment of overvoltage protection and consequently of total impairment of overvoltage protection.

The invention is not limited only to the expressly described or directly illustrated embodiments, but the modification of principle of gradual shifting of a single cut-off mechanism depending on temperature of varistor or varistors establishing gradually status indication of partial and total impairment of overvoltage protection lies in the scope of mere specialized skill of an average specialist in this technical field. The invention is not limited to the two-stage indication of partially impaired-totally impaired.

The invention claimed is:

1. An overvoltage protection device, comprising:
- a. at least one non-linear resistance element; and
- b. a single cut-off device coupled with the at least one non-linear resistance element to disable the at least one non-linear resistance element when the at least one non-linear resistance element reaches a pre-determined temperature, wherein the single cut-off device comprises
  - i. a shiftable actuator;
  - ii. a first solder having a first melting point connecting the actuator to the at least one non-linear resistance element, the actuator movable to a first shift position upon melting of the first solder; and
  - iii. a second solder having a second melting point, higher than the first melting point, connecting the actuator to the at least one non-linear resistance element, the actuator movable to a second shift position upon melting of the second solder; and
  - iv. a status indicator operably connected to the actuator to give a visual indication of a first condition of the non-linear resistance element at the first shift position of the actuator and a different visual indication of a second condition of the non-linear resistance element at the second shift position of the actuator.

2. The overvoltage protection device of claim 1, wherein the at least one non-linear resistance element is a varistor.

3. The overvoltage protection device of claim 1, wherein the actuator comprises a shifting part that shifts when the at least one non-linear resistance element heats the first solder to the first melting point.

4. The overvoltage protection device of claim 3, wherein the shifting part shifts to disable the at least one non-linear resistance element when the at least one non-linear resistance element heats the second solder to the second melting point.

5. The overvoltage protection device of claim 1, wherein the status indicator comprises a lever and the actuator moves the lever to indicate the one of at least two conditions of the at least one non-linear resistance element.

6. The overvoltage protection device of claim 5, wherein the status indicator further comprises a spring connected to the lever to bias the lever.

7. The overvoltage protection device of claim 1, wherein the shiftable actuator comprises
- a lever;
- a conductive connecting element;
- a spring connected to the lever to bias the lever against the conductive connecting element;
- an adaptor coupled to the conductive connecting element; and wherein the first solder connects the adaptor to the conductive connecting element, and the second solder connecting the adaptor to the non-linear resistance element.

8. The overvoltage protection device of claim 1, wherein the shiftable actuator comprises
- a lever;
- a conductive strip adaptor coupled to the at least one non-linear resistance element;
- a spring connected to the lever to bias the lever against the conductive strip; and wherein the first solder connects the conductive strip to the non-linear resistance element, and the second solder connects the conductive strip adaptor to the at feast one non-linear resistance element.

* * * * *